United States Patent
Raether

(10) Patent No.: US 8,057,582 B2
(45) Date of Patent: *Nov. 15, 2011

(54) SYSTEM CONFIGURATION OF PULSED CLEANED PANEL-STYLE FILTER ELEMENTS AND METHODS

(75) Inventor: Thomas D. Raether, St. Louis Park, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 448 days.

This patent is subject to a terminal disclaimer.

(21) Appl. No.: 11/946,914

(22) Filed: Nov. 29, 2007

(65) Prior Publication Data

US 2008/0127825 A1   Jun. 5, 2008

Related U.S. Application Data

(60) Provisional application No. 60/867,896, filed on Nov. 30, 2006.

(51) Int. Cl.
*B01D 46/00* (2006.01)

(52) U.S. Cl. .......... 95/280; 55/302; 55/341.1; 55/341.7; 55/484; 55/521

(58) Field of Classification Search .................. 55/283, 55/293, 294, 301, 302, 341.1, 341.2, 341.3, 55/341.5, 341.7, 484, 521; 95/280, 278; 96/349, 428

See application file for complete search history.

(56) References Cited

U.S. PATENT DOCUMENTS

| | | |
|---|---|---|
| 2,591,198 A | 4/1952 | Ringe |
| 2,748,948 A | 6/1956 | Fricke et al. |
| 2,836,257 A | 5/1958 | Muller |

(Continued)

FOREIGN PATENT DOCUMENTS

AT    350591    6/1979

(Continued)

OTHER PUBLICATIONS

International Search Report, mailed Jun. 9, 2008.

*Primary Examiner* — Duane Smith
*Assistant Examiner* — Thomas McKenzie
(74) *Attorney, Agent, or Firm* — Merchant & Gould P.C.

(57) ABSTRACT

An air cleaner is provided including a housing having a dirty air inlet, a clean air outlet, and an interior. A tubesheet is in the housing interior and has a plurality of openings. The tubesheet is oriented in one of either a generally horizontal or a generally vertical position. A plurality of panel-style filters is provided, with each filter being mounted in a respective one of the openings in the tubesheet. The air cleaner also has a plurality of blowpipes, with each blowpipe being oriented to direct a fluid pulse at a respective one of the panel-style filters at an angle that is: (i) not normal to a plane of the openings in the tubesheets; and (ii) not in line with a general direction of filtration flow through the respective panel-style filter. A method of pulse cleaning panel-style filters oriented in openings of a tubesheet is provided. The method includes directing fluid pulses at each of the panel-style filters at angle that is: (i) not normal to a plane of the openings of the tubesheet; and (ii) not in line with a general direction of filtration flow through the panel-style filters. The panel-style filters are oriented in the tubesheet, and the tubesheet is oriented in one of either a generally horizontal or a generally vertical position.

9 Claims, 11 Drawing Sheets

U.S. PATENT DOCUMENTS

| | | |
|---|---|---|
| 3,095,290 A | 6/1963 | Hockett |
| 3,173,777 A | 3/1965 | Tamny |
| 3,234,714 A | 2/1966 | Rymer et al. |
| 3,325,978 A | 6/1967 | Rymer et al. |
| 3,394,532 A | 7/1968 | Oetiker |
| 3,402,881 A | 9/1968 | Moore et al. |
| 3,487,609 A | 1/1970 | Caplan |
| 3,499,268 A | 3/1970 | Pausch |
| 3,508,383 A | 4/1970 | Humbert, Jr. et al. |
| 3,509,698 A | 5/1970 | Medcalf et al. |
| 3,535,852 A | 10/1970 | Hirs |
| 3,692,184 A | 9/1972 | Miller, Jr. et al. |
| 3,726,066 A | 4/1973 | Colley et al. |
| 3,732,669 A | 5/1973 | Chambers |
| 3,735,566 A | 5/1973 | Laliwala |
| 3,757,497 A | 9/1973 | Ray |
| 3,807,150 A | 4/1974 | Maracle |
| 3,831,354 A | 8/1974 | Bakke |
| 3,853,509 A | 12/1974 | Leliaert |
| 3,874,857 A | 4/1975 | Hunt et al. |
| 3,883,331 A | 5/1975 | Bernard et al. |
| 3,942,962 A | 3/1976 | Duyckinck |
| 4,171,963 A | 10/1979 | Schuler |
| 4,218,227 A | 8/1980 | Frey |
| 4,227,903 A | 10/1980 | Gustavsson et al. |
| 4,251,244 A | 2/1981 | Evenstad |
| 4,272,262 A | 6/1981 | Britt et al. |
| 4,277,260 A | 7/1981 | Browning |
| 4,278,454 A | 7/1981 | Nemesi |
| 4,292,057 A | 9/1981 | Ulvestad et al. |
| 4,303,417 A | 12/1981 | Koch |
| 4,306,893 A | 12/1981 | Fernando et al. |
| 4,395,269 A | 7/1983 | Schuler |
| 4,504,288 A | 3/1985 | Kreft |
| 4,504,293 A | 3/1985 | Gillingham |
| 4,578,092 A | 3/1986 | Klimczak |
| 4,632,680 A | 12/1986 | Klimczak |
| 4,661,131 A | 4/1987 | Howeth |
| 4,820,320 A | 4/1989 | Cox |
| 4,909,813 A | 3/1990 | Eggerstedt |
| 4,955,996 A | 9/1990 | Edwards et al. |
| 5,002,594 A | 3/1991 | Merritt |
| 5,062,867 A | 11/1991 | Klimczak |
| 5,062,872 A | 11/1991 | Williams |
| 5,062,873 A | 11/1991 | Karlsson |
| 5,393,327 A | 2/1995 | Chambers et al. |
| 5,421,845 A | 6/1995 | Gregg et al. |
| 5,562,746 A * | 10/1996 | Raether .................. 55/302 |
| 5,980,598 A | 11/1999 | Horvat |
| 6,022,388 A * | 2/2000 | Andersson et al. ......... 55/302 |
| 6,090,173 A | 7/2000 | Johnson et al. |
| 6,322,618 B1 | 11/2001 | Simms et al. |
| 6,673,136 B2 * | 1/2004 | Gillingham et al. ......... 95/273 |
| 6,908,494 B2 * | 6/2005 | Gillingham et al. ......... 55/283 |
| 6,960,245 B2 * | 11/2005 | Tokar et al. ................ 95/273 |
| 7,252,704 B2 * | 8/2007 | Tokar et al. ................ 95/273 |
| 7,282,075 B2 | 10/2007 | Sporre et al. |
| 7,388,544 B2 * | 6/2008 | Bit-Babik et al. .......... 343/702 |
| 2005/0120881 A1 * | 6/2005 | Sporre et al. .............. 95/280 |
| 2005/0155334 A1 * | 7/2005 | Pearson et al. ............. 55/380 |
| 2005/0166559 A1 | 8/2005 | Gillingham |
| 2008/0127826 A1 * | 6/2008 | Raether .................. 95/280 |
| 2008/0127827 A1 * | 6/2008 | Raether .................. 95/280 |

FOREIGN PATENT DOCUMENTS

| | | |
|---|---|---|
| DE | 1 228 130 | 11/1966 |
| DE | 1 407 933 | 4/1972 |
| DE | 2309666 | 5/1974 |
| DE | 23 09 666 A1 | 9/1974 |
| DE | 85 36 339 U1 | 5/1987 |
| DE | 39 05 113 A1 | 8/1990 |
| DE | 296 13 098 U1 | 9/1996 |
| EP | 0123 721 A1 | 9/1983 |
| EP | 0 338 314 | 10/1989 |
| EP | 1 358 922 | 11/2003 |
| FR | 1 184 609 | 7/1959 |
| FR | 1 413 752 | 11/1964 |
| FR | 1 590 764 | 4/1970 |
| FR | 2 401 690 | 8/1977 |
| FR | 2709978 | 3/1995 |
| GB | 326 047 | 3/1930 |
| GB | 662.358 | 12/1951 |
| GB | 781 194 | 8/1957 |
| GB | 838 523 | 6/1960 |
| GB | 880 043 | 10/1961 |
| GB | 914 187 | 12/1962 |
| GB | 939 641 | 10/1963 |
| GB | 948 705 | 2/1964 |
| GB | 1016556 | 1/1966 |
| GB | 1113154 | 5/1968 |
| GB | 1 220 174 | 1/1971 |
| GB | 1 345 977 | 2/1974 |
| SU | 627841 | 10/1978 |
| WO | WO 86 03994 | 7/1986 |

* cited by examiner

US 8,057,582 B2

SYSTEM CONFIGURATION OF PULSED CLEANED PANEL-STYLE FILTER ELEMENTS AND METHODS

CROSS REFERENCE TO RELATED APPLICATION

This application claims priority from provisional application Ser. No. 60/867,896, filed Nov. 30, 2006, and which is incorporated herein by reference.

TECHNICAL FIELD

This disclosure relates to methods for pulse cleaning filter elements utilizing pressurized gas generators. This disclosure also relates to apparatus including air cleaners, dust filters, and pulse cleaning technology.

BACKGROUND

Air cleaners or dust collector devices sometimes use exhaust gas from a valve and pressure tank (reservoir) to back flush filters. Examples of such air filters assemblies are disclosed in, for example, U.S. Pat. Nos. 6,090,173; 4,218,227; 4,395,269; 5,980,598; 6,322,618; DE 3905113; and Patent Publication U.S. 2006/0112667A1, each of these patent documents being incorporated by reference herein.

Effective cleaning of these filters requires that the exhaust jet fill the opening of the filter to be cleaned. In many implementations, the opening of the filter corresponds to the opening in the tubesheet, in which the filter is mounted. Improvements in pulse cleaning filters are desirable.

SUMMARY

An air cleaner is provided including a housing having a dirty air inlet, a clean air outlet, and an interior. A tubesheet is in the housing interior and has a plurality of openings. The tubesheet is oriented in one of either a generally horizontal or a generally vertical position. A plurality of panel-style filters is provided, with each filter being mounted in a respective one of the openings in the tubesheet. The air cleaner also has a plurality of blowpipes, with each blowpipe being oriented to direct a fluid pulse at a respective one of the panel-style filters at an angle that is: (i) not normal to a plane of the openings in the tubesheets; and (ii) not in line with a general direction of filtration flow through the respective panel-style filter.

A method of pulse cleaning panel-style filters oriented in openings of a tubesheet is provided. The method includes directing fluid pulses at each of the panel-style filters at angle that is: (i) not normal to a plane of the openings of the tubesheet; and (ii) not in line with a general direction of filtration flow through the panel-style filters. The panel-style filters are oriented in the tubesheet, and the tubesheet is oriented in one of either a generally horizontal or a generally vertical position.

DETAILED DESCRIPTION

Figure 1:
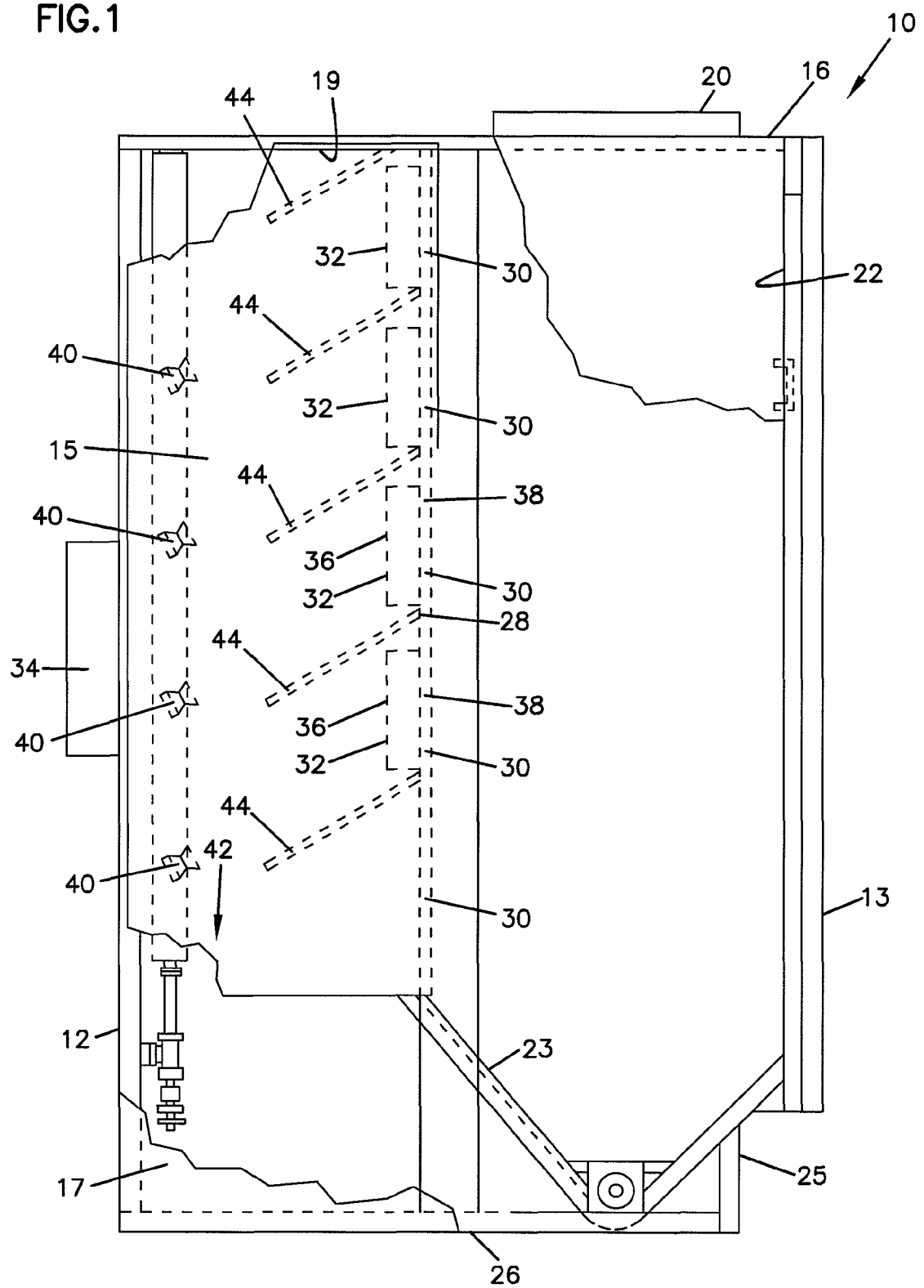
FIG. 1 is a side elevational view, partially broken away, of one embodiment of an air filter system utilizing principles of this disclosure.

A dust filter or air cleaner system is depicted generally at 10 in FIG. 1. The system depicted includes a housing 12 having a side wall panel 17 broken away to illustrate the arrangement of various portions of the assembly. An upper wall panel 16 has an inner wall surface 19. In this embodiment, an air inlet 20 is positioned in the upper wall panel 16 so that the particulate-laden air or other fluid is introduced into an unfiltered (dirty) fluid chamber 22. The unfiltered chamber 22 is defined by an access door 13, the upper wall panel 16, opposing side wall panels 17, a tubesheet 28, and a bottom surface 23 partially defining a collection area or hopper 25. The bottom base panel or frame 26 is secured to the side wall panels 17 in a suitable manner.

As mentioned above, the tubesheet 28 is mounted in the interior of the housing 12. The tubesheet 28 includes a plurality of openings 30. Within each opening 30 is mounted an individual filter element, which in the illustrated embodiment, is a panel-style filter element 32. By the term "panel-style filter element" it is meant an element with filter media in which, in general, fluid to the filtered flows through the filter element in a straight-flow thorough manner. For example, a panel-style filter element can be pleated media, depth media, fluted media, zee media, or mini V-packs. By "Z-media", it is meant media having first and second opposite flow faces with a plurality of flutes, each of the flutes having an upstream portion adjacent to the first flow face and a downstream portion adjacent to second flow face, selected ones at the flutes being open at the upstream portion and closed at the downstream portion, while selected ones of the flutes are closed at the upstream portion and open at the downstream portion. The flutes can be straight, tapered, or darted. Examples of filter elements with Z-media are found in, for example, U.S. Pat. No. 5,820,646; Patent Publication 2003/0121845; and U.S. Pat. No. 6,350,291, each of these patent documents being incorporated by reference herein.

In operation, fluid, such as air, to be filtered flows into the system 10 through the inlet 20. From there, it flows through the filter elements 32. The filter elements 32 remove particulate material from the fluid. The filtered fluid then flows into the clean air or filtered flow chamber 15. From there, the clean air flows through an outlet 34. Periodically, the filter elements 32 will be cleaned by pulsing a fluid jet, such as a jet of air, from a downstream side 36 of the filter element 32 to an upstream side 38 of the filter element 32. Specifically, a jet of pressurized gas will be directed through individual blow pipes 40, a respective blow pipe being oriented for each of the respective filter elements 32. This will direct the jet through each filter element 32, from the downstream side 36 to the upstream side 38. This helps to knock debris and particulate from the upstream side 38 of the filter element 32, directing it off the filter element 32 and into a hopper.

Figure 2:
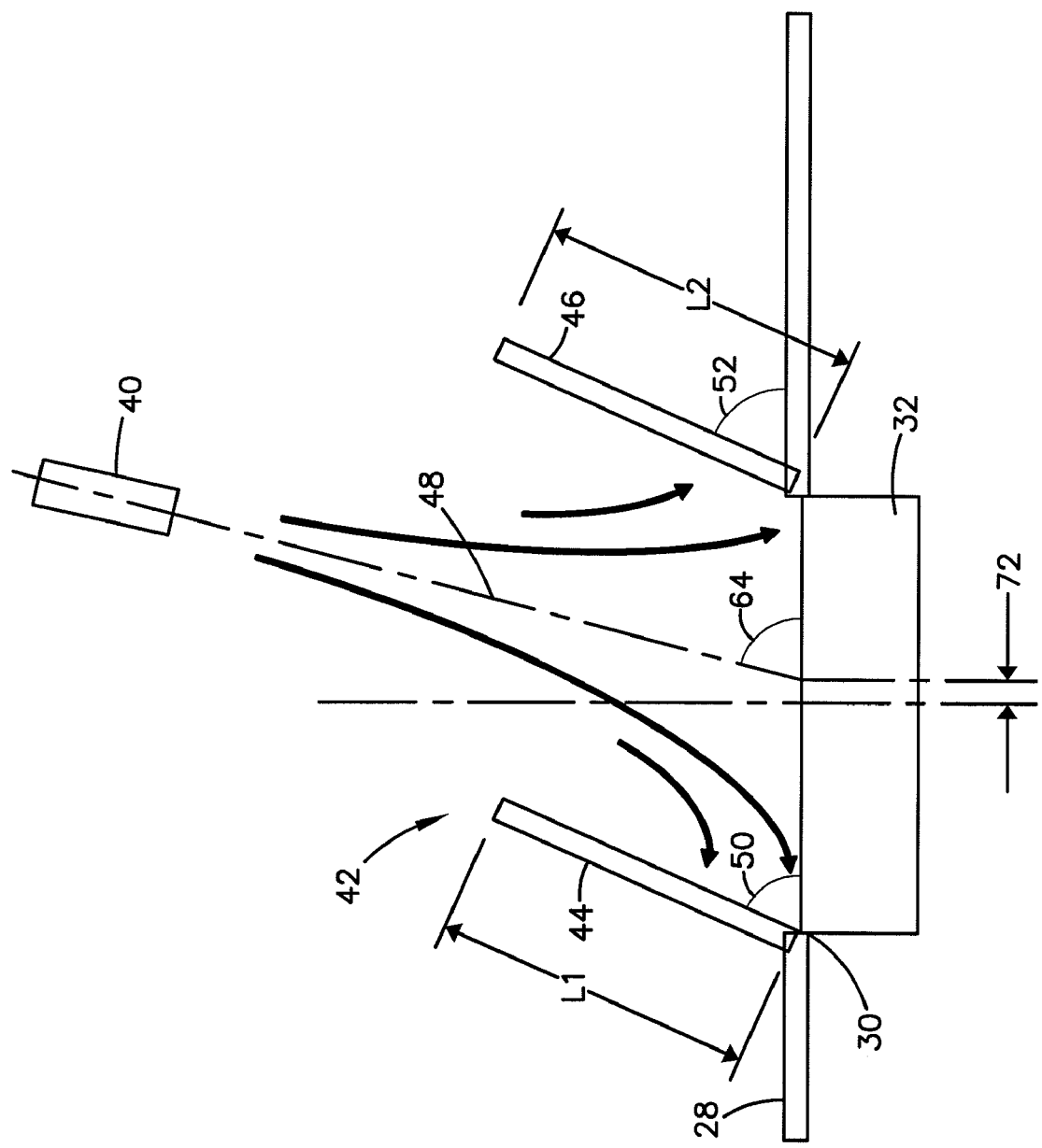
FIG. 2 is a schematic side elevational view illustrating principles of this disclosure.

A schematic illustration of the portion of the system 10 is illustrated in FIG. 2. In FIG. 2, the blow pipe 40 can be seen oriented with respect one the filter elements 32 in the opening 30 in the tubesheet 28. In FIG. 2, it can be seen how the blow pipe 40 is oriented relative to the filter element 32 in a plane 60 (FIG. 3) that contains the respective opening 30 in the tubesheet 28 for the respective filter element 32, such that a pulse that comes from the blow pipe 40 is at an angle that is not normal to a plane of the opening 30 and is not in line with a general direction of filtration flow thorough the filter element 32. By the term "not normal", it is meant non-orthogonal, such as at an acute or obtuse angle relative to the plane 60 that contains the opening 30 for the respective filter element 32. By "not in line with a general direction of filtration flow", it is meant, for a straight-through flow filter, the pulse flow is in a direction that is not parallel to the flow of direction through the filter element 32. By directing the fluid pulse at the filter element 32 at such an angle 64, the exhaust jet, which expands at a predictable angle, creates a diameter D2 (FIG. 3) larger in one direction that a diameter D1 that is typically used in the prior art.

While the illustrated embodiment shows only a single blowpipe 40 corresponding to a single filter element 32, it should be understood that in many implementations, there are more than one blowpipe 40 for each element 32.

In a preferred embodiment, at least a portion of the pulse is trapped by using an accumulator arrangement 42. The accumulator arrangement 42 captures the flow of the pulse from the blow pipe 40. In one embodiment, the accumulator arrangement 42 includes a least one plate, shown as first plate 44, oriented on the clean air side 15 of the tubesheet 28 and adjacent to the opening 30 of the tubesheet 28. The first plate 44 may be any type of wall, sheet metal, panel, baffle, rigid plastic, or generally non-porous solid structure that is oriented to the adjacent respective opening in the tubesheet 28 for the respective filter element 32.

In certain implementations, the accumulator arrangement includes a second plate 46 oriented at an opposite end of the opening 30 at the tubesheet 28 from the first plate 44. In the embodiment shown, the first and second plates 44, 46 are aligned with the general direction of the pulse, but the angle does not necessarily need to be the same as the angle of the pulse direction. FIG. 2 illustrates a center line of the direction of the pulse at 48. The first plate is mounted at a first angle 50 relative to the tubesheet 28. The first angle is within about 5° of center line 48 of a direction of the pulse. Similarly, the second plate 46 is mounted at a second angle 52 relative to the tubesheet 28. The second angle 52 is within about 5° of the center line 48 of a direction of the pulse. In some embodiments, the first angle 50 and the second angle 52 are equal. In other embodiments, the first angle 50, and second angle 52 are unequal. In some embodiments, the first angle 50 and the second angle 52 are within 30° of being parallel to each other. The angles 50, 52 of the plates 44, 46 are selected based upon the angle 53 of the pulse.

As illustrated in FIG. 2, the first plate 44 has length $L_1$, which is preferably no longer than three times the length of the respective opening 30 in the tubesheet 28. This is because primary flow pressure loss increases with increase in length. Preferably, the length $L_1$ has a length that is between 25-75% of a length of the respective opening 30 in the tubesheet 28. In preferred embodiments, the blowpipe 40 is spaced no more than 30-40 times of an inside diameter of the blowpipe from the tubesheet to eject the pulse.

In FIG. 2, reference numeral 72 shows the offset between the pulse center line 48 and a center of the filter element 32. This shows how the center line 48 of the pulse is not always in alignment with the center of the filter element 32.

In one embodiment, the plate that is closer to the respective blow pipe 40 (in the embodiment illustrated, the second plate 46) has a length that is shorter than the other plate (in this example, the first plate 44). In one embodiment, this shorter plate 46 has a length that is not less than 5% of a length of the respective opening 30 in the tubesheet 28. This arrangement is advantageous because of both material savings and pressure loss associated with pumping air flow.

Figure 3:
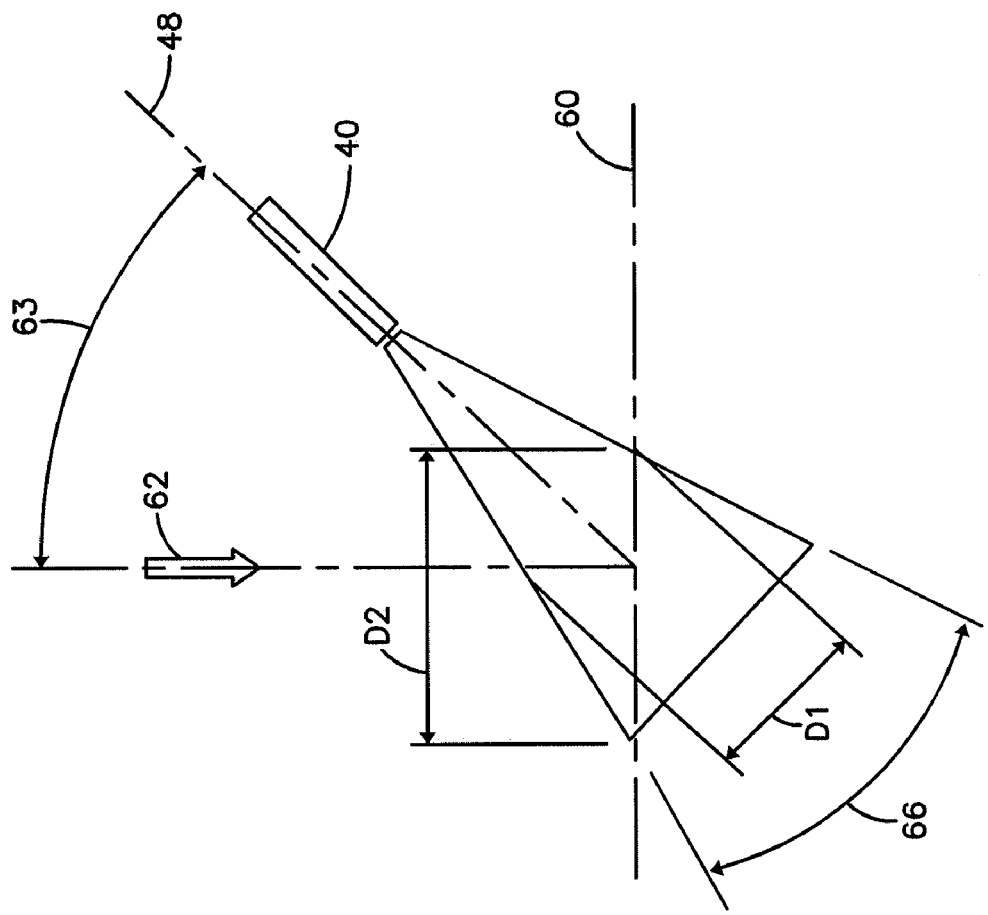
FIG. 3 is a schematic diagram illustrating principles of this disclosure.
Figure 4:
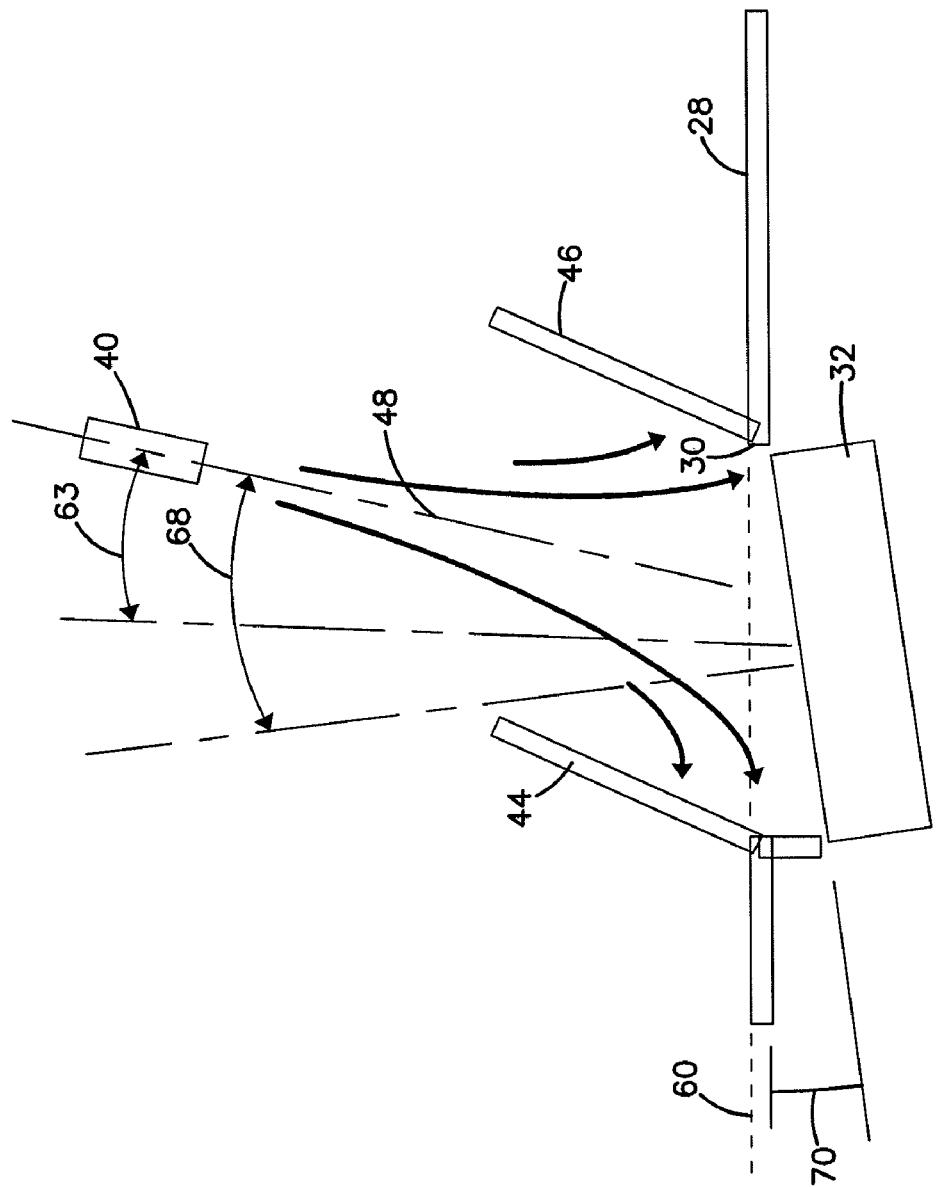
FIG. 4 is a schematic diagram illustrating principles of this disclosure.

Attention is directed to FIG. 3. In FIG. 3, the arrow 62 represents the prior art pulse direction. In the prior art, the standard pulse direction is directed perpendicular or normal to the plane 60 that contains the tubesheet 28. Angle 63 shows the angle that is offset to the vertical direction, or the direction from the standard, prior art direction shown by arrow 62. A typical pulse expansion is shown at angle 66, from the blow pipe 40. As explained above, the exhaust jet from the blow pipe 40 creates a diameter D2, covering a larger surface area in the opening 30 of tubesheet 28, versus diameter D1 that comes from the exhaust jet shown at arrow 62 in the prior art arrangement. In FIG. 4, an alternative arrangement of the filter element 32 relative to the tubesheet 28 is shown. In the FIG. 4 embodiment, the filter element 32 is offset at an angle 70 relative to the tubesheet opening 30. This arrangement results in an angle 68 of the pulse direction 48 greater at the face of the filter 36 than the angle 68 of the pulse direction 48 at the plane 60 of the tube sheet opening 30.

One useful arrangement has the following angles and dimensions: Angle 64 is 25°-35°, preferably 29°; angles 50 and 52 are equal and 18°-25°, preferably 22°-23°; first and second plates 44, 46 are parallel; offset 72 is about 1 inch; length L1 is about 16-20 inches, preferably about 18.75 inches; and length L2 is about 6-10 inches, preferably about 8.0 inches.

Figure 5:
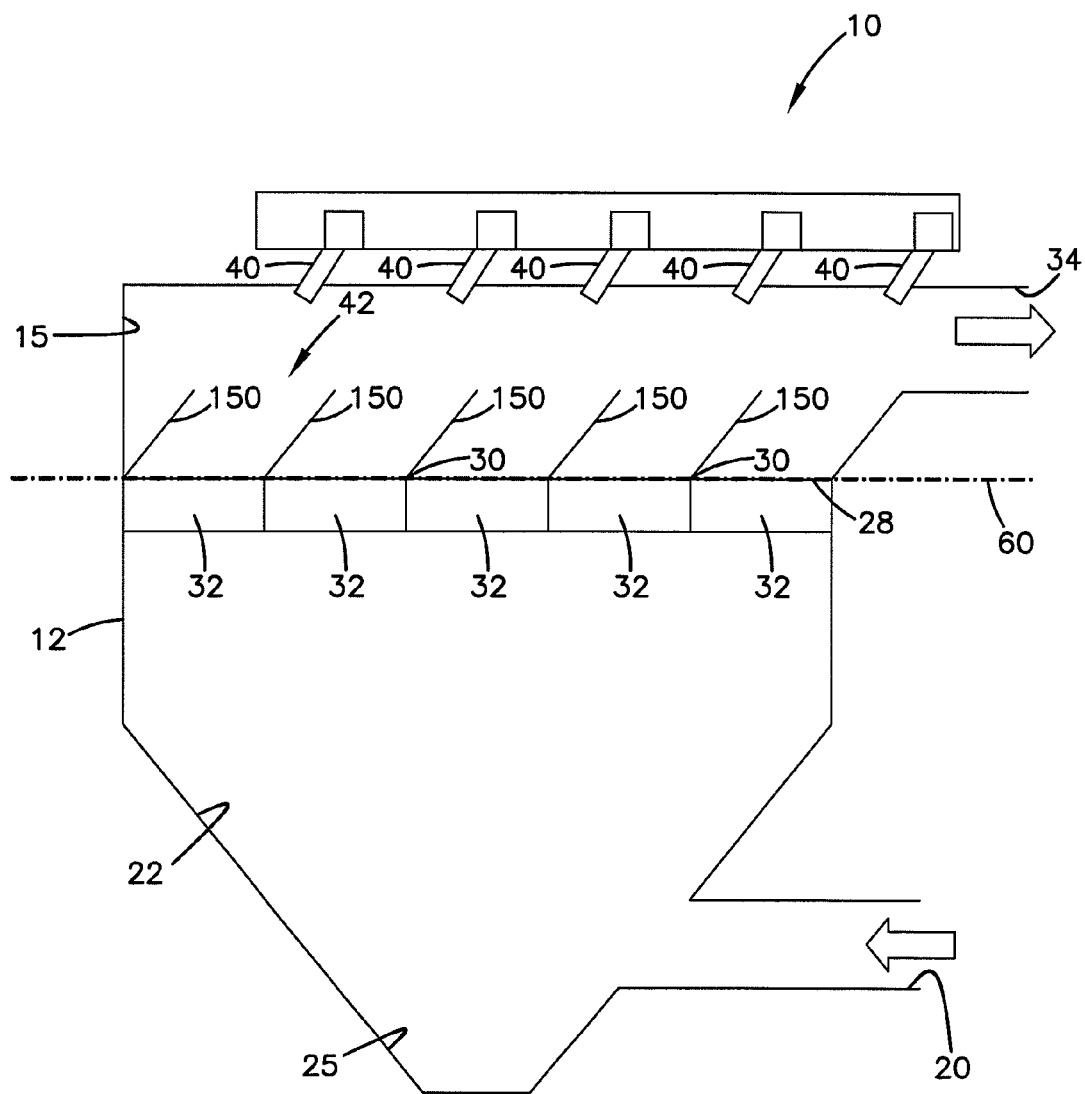
FIG. 5 is a schematic side elevational view of one embodiment of an air filter system utilizing principles of this disclosure.

FIG. 5 is a schematic, side elevational view of another embodiment of air cleaner 10. In this embodiment, the tubesheet 28 is shown in a generally horizontal orientation. By the term "generally horizontal" orientation, it is meant that the tubesheet 28 is located in plane 60, and plane 60 is oriented from 0°-45° relative to a generally horizontal plane. The filter elements 32 are mounted in openings 30 in the tubesheet 28. A blowpipe 40 is oriented to direct a fluid pulse at a respective one of the filters 32 in a fashion analogous to that described above with respect to FIGS. 1-4. An accumulator arrangement 42 is illustrated, and is embodied as a plurality of plates 150 adjacent to the openings 30 in the tubesheet 28 on the clean air side 15 of the tubesheet 28. The plates 150 between each respective opening 30 can be a common or shared plate 150. The filter elements 32 are generally parallel to plane 60. In this embodiment, there is very little space required between the filters 32, and there is no air flow between the filters 32.

Figure 6:
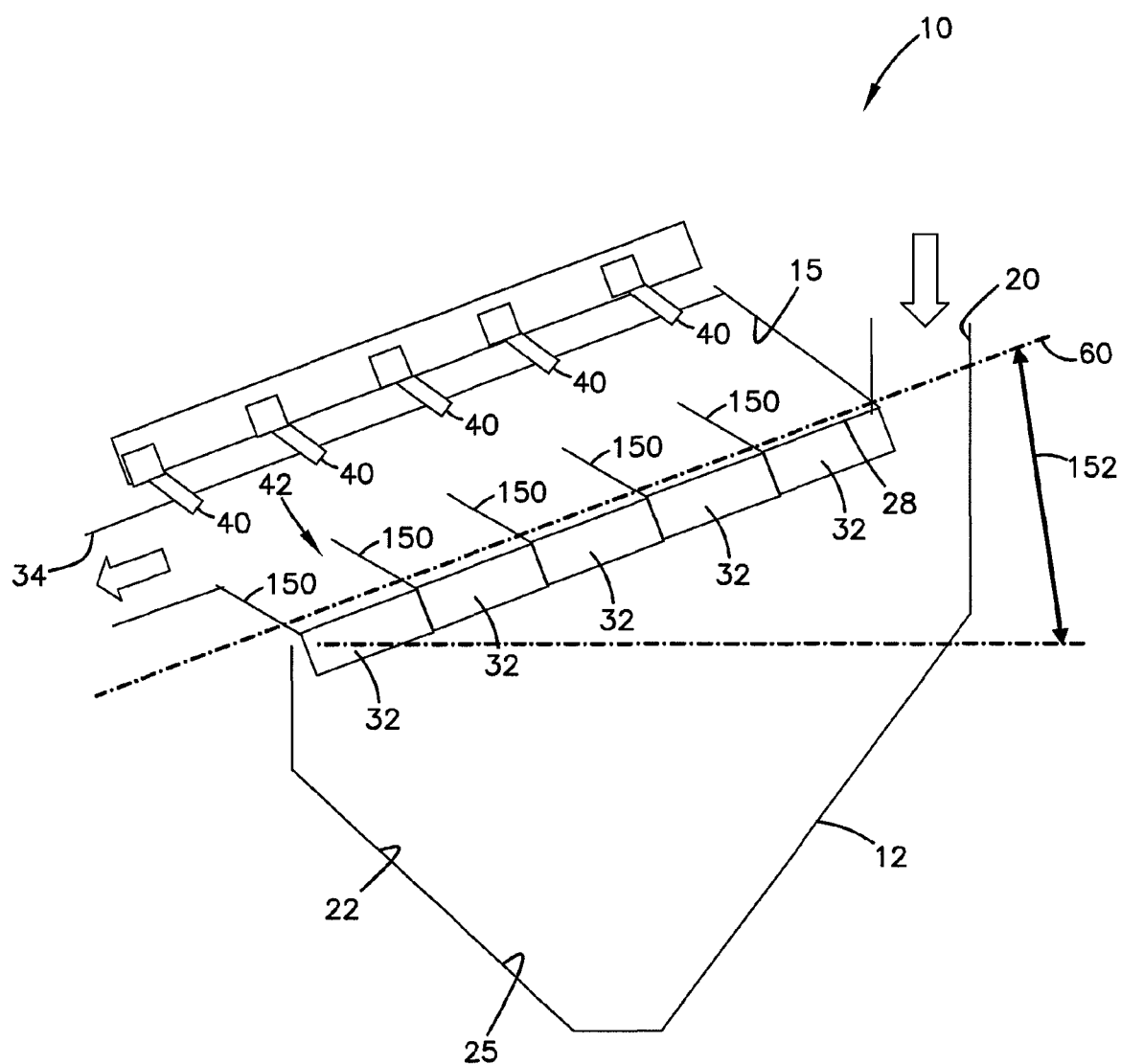
FIG. 6 is a schematic side elevational view of another embodiment of an air filter system utilizing principles of this disclosure.

FIG. 6 is another embodiment of an air cleaner 10. In FIG. 6, the tubesheet 28 is considered generally horizontal, with the plane 60 being at an angle between 0°-45° relative to the horizontal. In FIG. 6, the angle is shown at 152 and is about 30°. The filter elements 32 are generally parallel to the plane 60 of the tubesheet 28.

Figure 7:
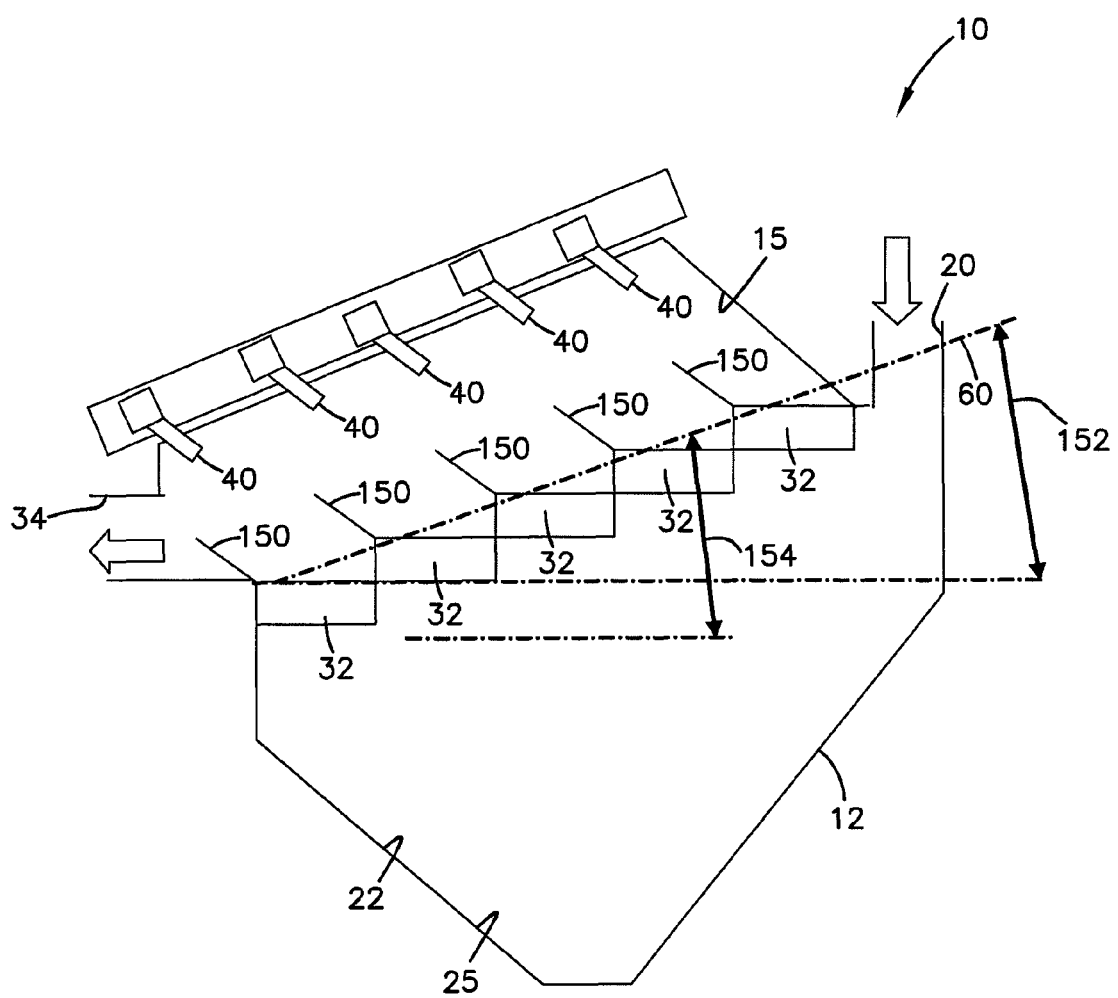
FIG. 7 is a schematic side elevational view of another embodiment of an air filter system utilizing principles of this disclosure.

FIG. 7 illustrates another embodiment of air cleaner 10. FIG. 7 is similar to the embodiment of FIG. 6, except that the filters 32 are at an angle 154 relative to the plane of the tubesheet. The angle 154 can range from 0°-45°, preferably less than 30°.

In the embodiments of FIGS. 6 and 7, the arrangement allows for a high inlet at 20 that can utilize the perpendicular or approximately perpendicular orientation of the primary air flow through the elements 32 and the pulse flow from the blow pipes 40. In the embodiment of FIG. 5, the side flow from inlet 20 attains similar advantages, in that it can utilize the perpendicular or near perpendicular orientation of the primary flow through the elements 32 and the pulse flow from the blow pipes 40. The arrangement of the housings 12 in the embodiments of FIGS. 5-7 aids in the reduction of re-entrainment of dust into the elements 32 from the hopper 25. In addition, in the embodiments of FIGS. 5-7, the dirty air coming through the inlet 20 is required to turn a corner, which slows velocity of the air flow and helps to cause dust to settle in the hopper 25 as opposed to being carried to the filter elements 32. Thus, dust load is reduced on the filter elements 32 when compared to conventional arrangements. Also, the embodiments of FIGS. 5-7 demonstrate how the shapes of the housings 12 can be generally short and squat, which results in reduced heights of the housings 12 when compared to prior art arrangements.

FIGS. 8-11 illustrate generally vertically oriented tubesheets 28. By the term "generally vertical", it is meant tubesheets being in a plane 60 that is angled from 0°-45° relative to a vertical plane. The embodiments of FIGS. 8-11 allow for the downward directing of dust into the hopper 25. This will aid in the reduction of re-entertainment of dust into the filters 32. The dust-laden air entering through the dirty air inlet 20 will be required to turn a corner in order to enter the face of the filter element 32. This will help slow the velocity of the dirty air, which will help cause the dust particles to drop by gravity into the hopper 25, and will reduce the dust flowed on the filter element 32, as compared to prior art arrangements. As can be seen in FIGS. 8-11, the arrangements of the air cleaners 10 are tall and slender, which will minimize the widths of housings 12, as compared to certain prior art arrangements.

Figure 8:
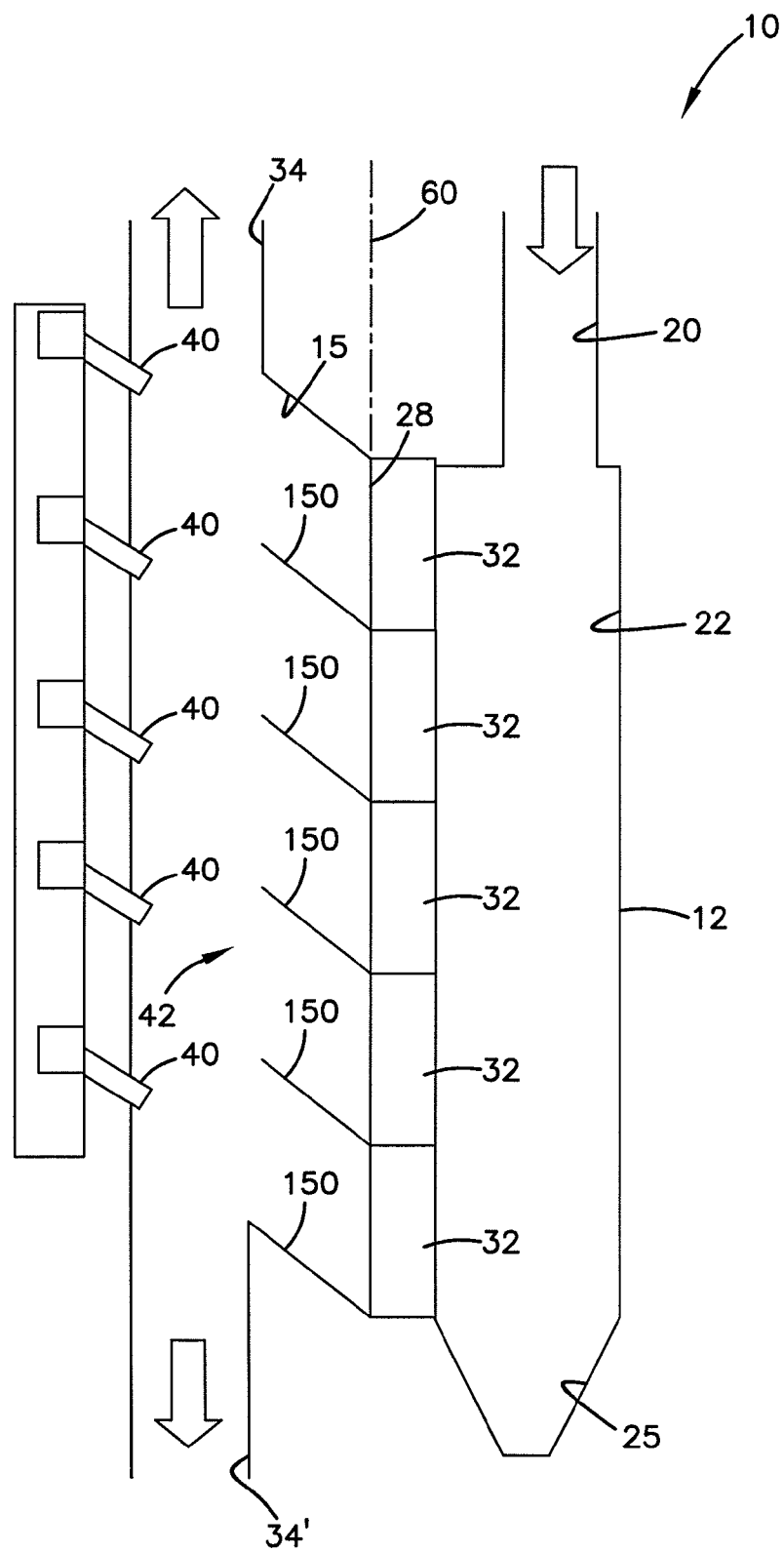
FIG. 8 is a schematic side elevational view of another embodiment of an air filter system utilizing principles of this disclosure.

In FIG. 8, the filter elements 32 are shown generally parallel to the vertical plane 60. The air entering through the dirty air inlet 20 enters through an upper part of the housing 12, and must turn a corner to flow through the filter elements 32. The clean air exits the arrangement 10 through clean air outlet 34. An alternate clean air outlet is also depicted at 34'. Arrangements can include just one of the clean air outlets 34, 34' or both.

Figure 9:
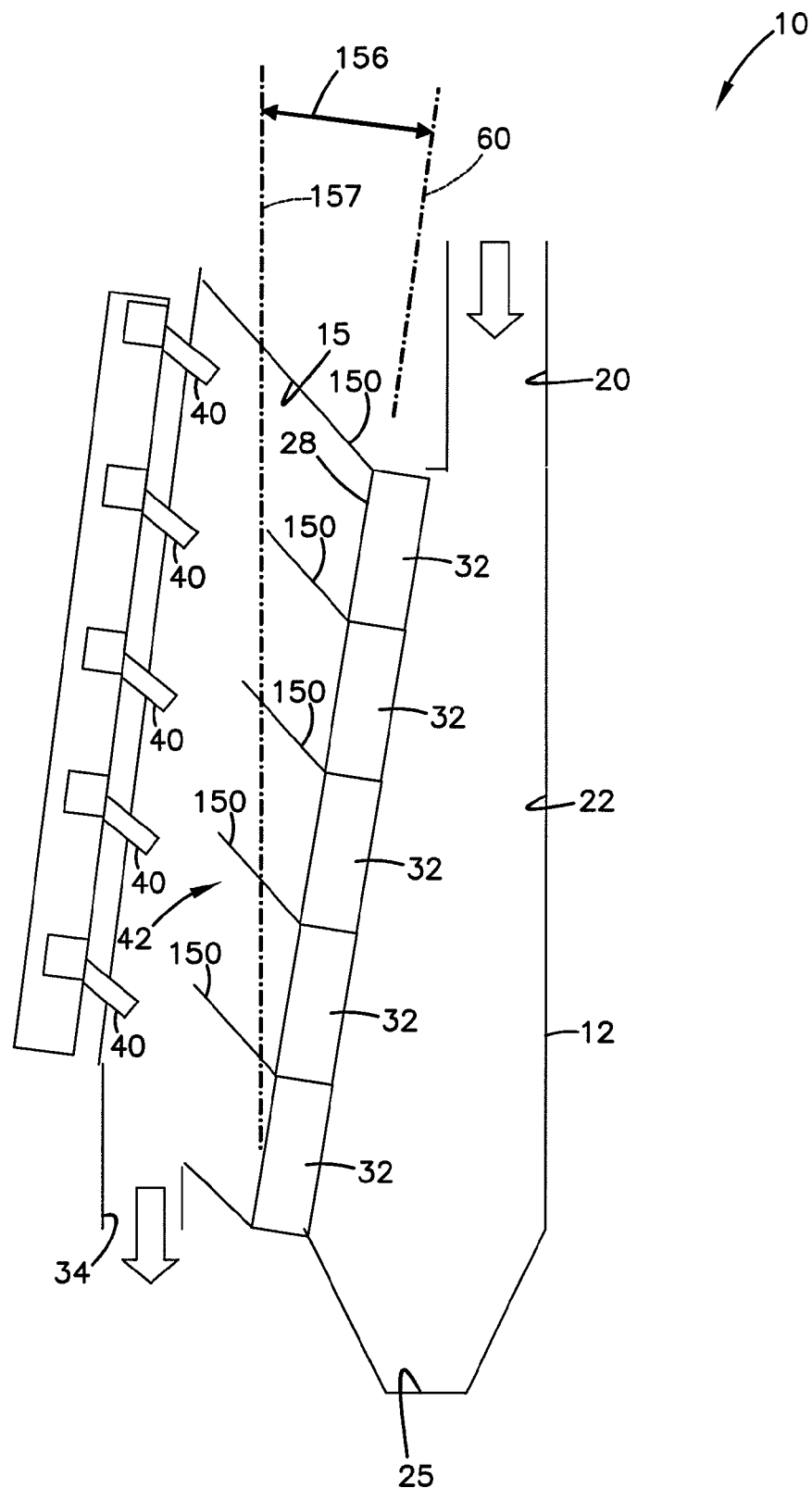
FIG. 9 is a schematic side elevational view of another embodiment of an air filter system utilizing principles of this disclosure.
Figure 10:
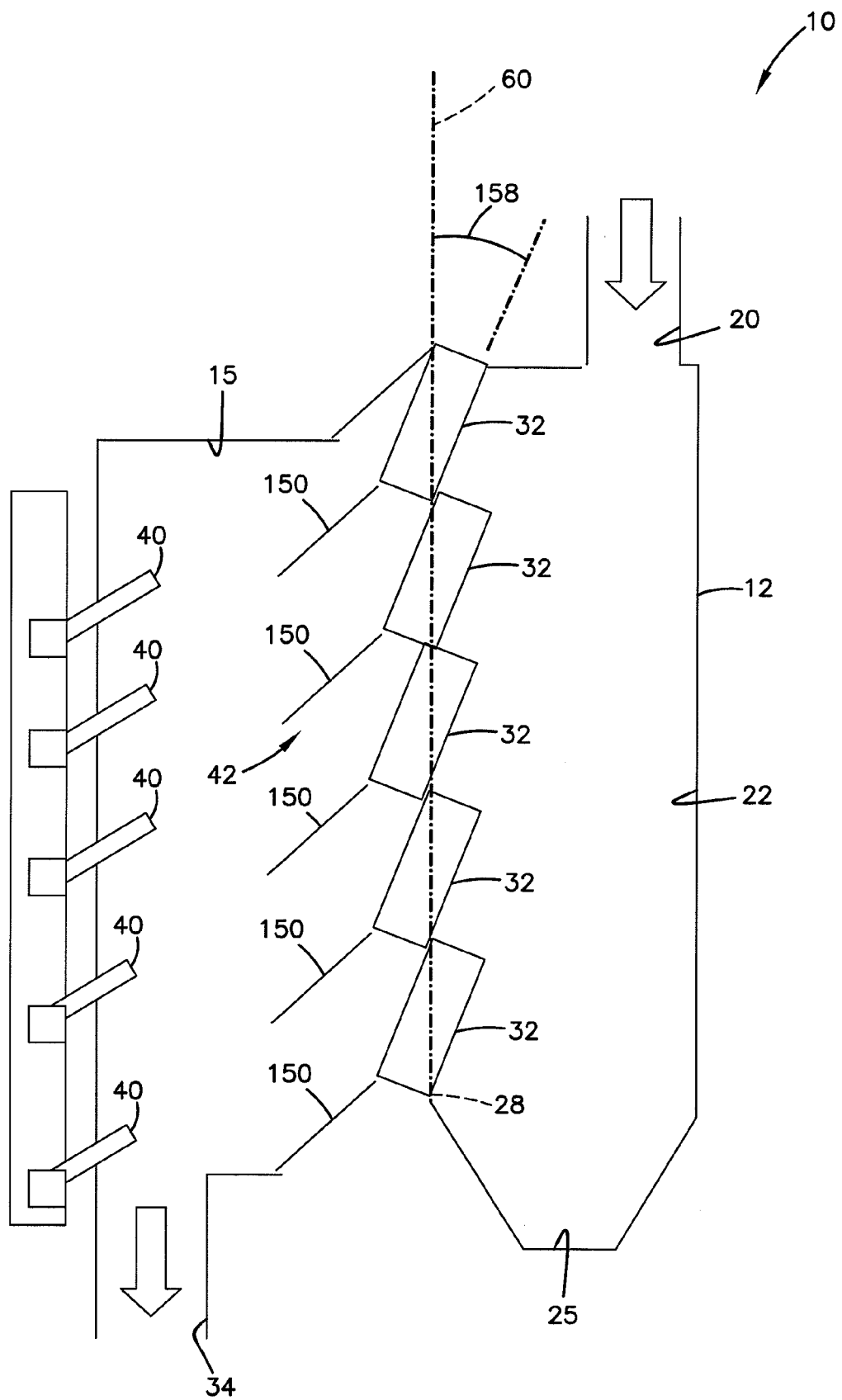
FIG. 10 is a schematic side elevational view of another embodiment of an air filter system utilizing principles of this disclosure.

FIG. 9 is another embodiment of a generally vertical arrangement of an air cleaner 10. In FIG. 10, the filters 32 are generally parallel to the general plane 60 of the tubesheet 28. The plane 60 of the tubesheet 28, however, is angled shown at angle 156 relative to a vertical plane. The angle 156 can be from 0°-45°, preferably about 30°.

FIG. 10 shows another embodiment. In this embodiment, the tubesheet 28 is parallel to the plane 60 and is generally vertical. The filter elements 32, however, are angled relative to the tubesheet 28. The angle of the elements 32 relative to the tubesheet 28 is shown generally at 158.

Figure 11:
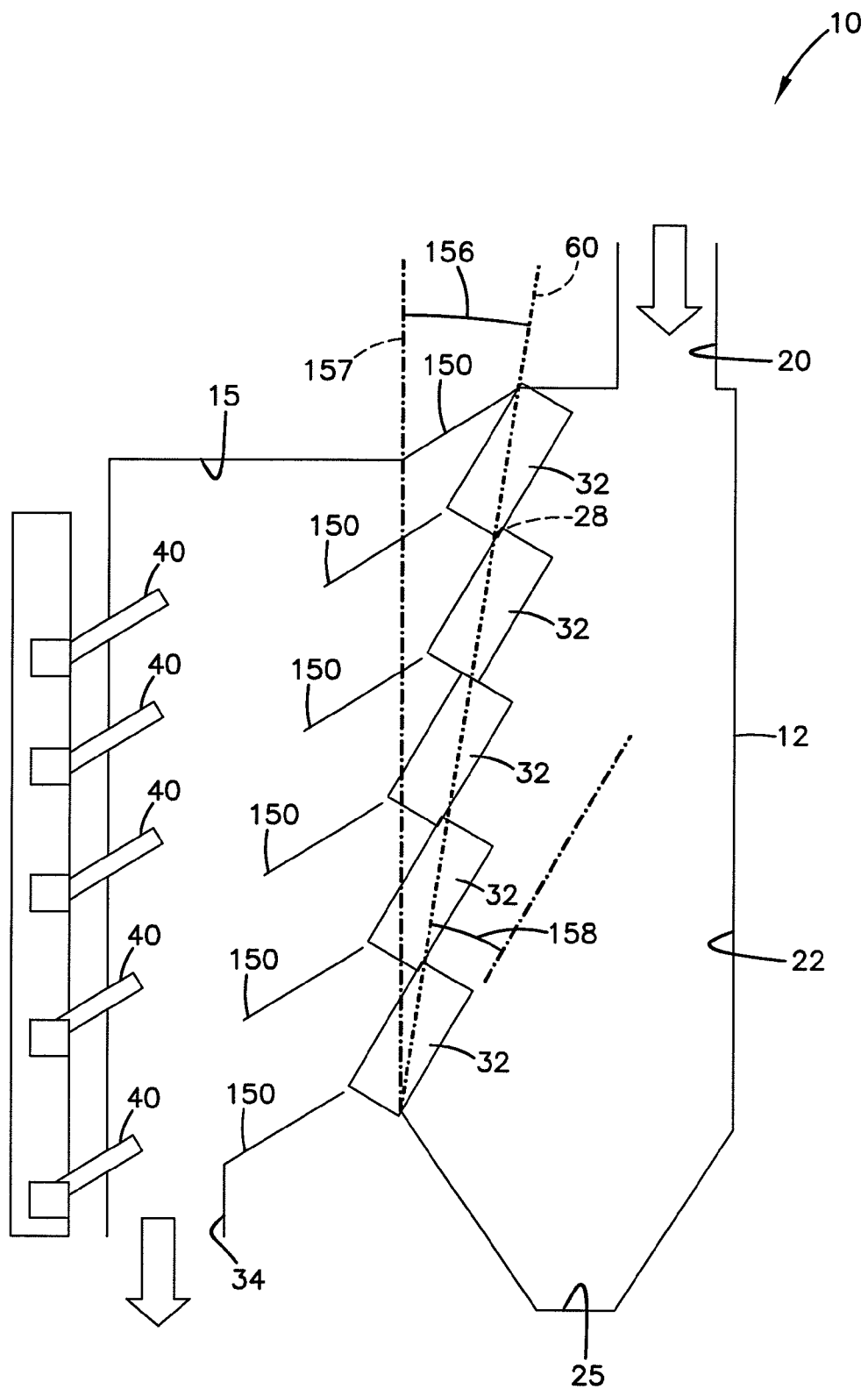
FIG. 11 is a schematic side elevational view of another embodiment of an air filter system utilizing principles of this disclosure.

FIG. 11 combines the concepts of FIGS. 9 and 10. In FIG. 11, the plane 60 that is parallel to the tubesheet 28 is angled at angle 156 relative to a generally vertical line 157. In addition, the elements 32 are angled relative to the tubesheet 28, shown at angle 158. Angle 156 and angle 158 can be from 0°-45°, preferably about 30°.

What is claimed:

1. An air cleaner comprising:
   (a) a housing including a dirty air inlet, a clean air outlet, and an interior;
   (b) a planer tubesheet in the housing interior having a plurality of openings in the same plane as the tubesheet;
      (i) the tubesheet being oriented in one of either generally horizontal or generally vertical position;
   (c) a plurality of z-media panel-style filters, each filter being mounted in a respective one of the openings in the tubesheet; each filter having a flow face and a center, the filter flow faces being generally parallel to the plane of the tubesheet; each of the filters being mounted in the respective one of the openings to permit air to flow through the filter faces in a straight flow through direction; and
   (d) a plurality of blowpipes
      (i) each blowpipe being oriented to direct a fluid pulse having a centerline at a respective one of the panel-style filters that is not aligned with the center of the filter; each fluid pulse being directed at an angle that is:
         (A) not normal to the plane of the openings in the tubesheet;
         (B) not in line with the direction of filtration flow through the respective panel-style filter; and
         (C) offset to the plane of the openings in the tubesheet of at least about 25°; and
      (ii) each blowpipe having an inside diameter and being spaced no more than 30-40 times of the inside diameter of the blowpipe from the tubesheet.

2. An air cleaner according to claim 1 further comprising:
   (a) an accumulator arrangement oriented adjacent to the openings in the tubesheet on a downstream side of the tubesheet.

3. An air cleaner according to claim 2 wherein:
   (a) the accumulator arrangement includes a plurality of plates oriented adjacent to the openings in the tubesheet.

4. An air cleaner according to claim 1 wherein:
   (a) the tubesheet is generally horizontal and is angled from 0° to 45° relative to a horizontal plane.

5. An air cleaner according to claim 1 wherein:
   (a) the tubesheet is generally vertical and is angled from 0° to 45° relative to a vertical plane.

6. A method of pulse cleaning z-media panel-style filters oriented in openings of a planer tubesheet, the openings being the same plane as the tubesheet ; the method comprising:
   (a) providing z-media panel style filters each having a flow face that is generally parallel to the plane of the tubesheet and being mounted in the openings to permit air to flow through the flow face in a straight flow through direction; and
   (b) directing fluid pulses through a blowpipe at the flow face of each of the panel-style filters at an angle that is:
      (i) not normal to the plane of the openings of the tubesheet;
      (ii) not in line with direction of filtration flow through the panel-style filters;
      (iii) offset to the plane of the openings in the tubesheet of about at least 25°;
   wherein the tubesheet is oriented in one of either generally horizontal or generally vertical position; and each blowpipe is spaced no more than 30-40 times of an inside diameter of the blowpipe from the tubesheet.

7. A method according to claim 6 wherein:

(a) the step of directing fluid pulses includes trapping at least a portion of the fluid pulses by using an accumulator.

8. A method according to claim 6 wherein:

(a) the step of directing fluid pulses includes directing the fluid pulses toward the openings in the tubesheet, the tubesheet being generally horizontal and angled from 0° to 45° relative to a horizontal plane.

9. A method according to claim 6 wherein:

(a) the step of directing fluid pulses includes directing the fluid pulses toward the openings in the tubesheet, the tubesheet being generally vertical and angled from 0° to 45° relative to a vertical plane.

* * * * *

UNITED STATES PATENT AND TRADEMARK OFFICE
CERTIFICATE OF CORRECTION

| | |
|---|---|
| PATENT NO. | : 8,057,582 B2 |
| APPLICATION NO. | : 11/946914 |
| DATED | : November 15, 2011 |
| INVENTOR(S) | : Raether |

It is certified that error appears in the above-identified patent and that said Letters Patent is hereby corrected as shown below:

Col. 5, line 35: "reduction of re-entertainment of dust" should read --reduction of re-entrainment of dust--

Signed and Sealed this
Thirty-first Day of July, 2012

David J. Kappos
*Director of the United States Patent and Trademark Office*